(12) United States Patent
Salama et al.

(10) Patent No.: US 9,475,008 B2
(45) Date of Patent: Oct. 25, 2016

(54) SEMIPERMEABLE FILTRATION MEMBRANE WITH INTEGRATED PRODUCING CIRCUIT

(76) Inventors: Amir Salama, Shefford (CA); Marianne Salama, Shefford (CA)

( * ) Notice: Subject to any disclaimer, the term of this patent is extended or adjusted under 35 U.S.C. 154(b) by 460 days.

(21) Appl. No.: 13/261,807

(22) PCT Filed: Aug. 3, 2012

(86) PCT No.: PCT/CA2012/050528
§ 371 (c)(1),
(2), (4) Date: Jul. 7, 2014

(87) PCT Pub. No.: WO2013/023289
PCT Pub. Date: Feb. 21, 2013

(65) Prior Publication Data
US 2014/0346110 A1 Nov. 27, 2014

Related U.S. Application Data

(60) Provisional application No. 61/522,801, filed on Aug. 12, 2011.

(51) Int. Cl.
| | |
|---|---|
| *B01D 61/00* | (2006.01) |
| *C02F 1/00* | (2006.01) |
| *C02F 1/78* | (2006.01) |
| *B25C 1/02* | (2006.01) |
| *B01D 65/08* | (2006.01) |

(Continued)

(52) U.S. Cl.
CPC .............. *B01D 65/08* (2013.01); *B01D 61/025* (2013.01); *B01D 61/027* (2013.01); *B01D 61/145* (2013.01); *B01D 61/364* (2013.01); *B01D 71/10* (2013.01); *B01D 71/34* (2013.01); *B01D 71/36* (2013.01); *B01D 71/64* (2013.01); *C02F 1/441* (2013.01); *C02F 1/442* (2013.01); *C02F 1/444* (2013.01); *C02F 1/447* (2013.01); *B01D 2311/12* (2013.01); *B01D 2311/2692* (2013.01); *B01D 2313/345* (2013.01); *B01D 2321/168* (2013.01); *C02F 1/44* (2013.01); *C02F 1/78* (2013.01); *C02F 2101/30* (2013.01); *C02F 2201/782* (2013.01); *C02F 2303/20* (2013.01); *Y10T 29/49128* (2015.01)

(58) Field of Classification Search
CPC ............ C02F 1/78; C02F 9/00; C02F 1/001; C02F 1/444; C02F 2303/04; C02F 2201/782; C02F 1/441
See application file for complete search history.

(56) References Cited

U.S. PATENT DOCUMENTS

| | | | | |
|---|---|---|---|---|
| 5,685,980 | A * | 11/1997 | Patapoff ................. | B01D 61/08 210/244 |
| 6,409,928 | B1 * | 6/2002 | Gonzalez ............. | B01D 53/864 210/198.1 |
| 6,553,490 | B1 * | 4/2003 | Kottapurath .............. | G06F 8/65 713/1 |
| 8,440,080 | B2 * | 5/2013 | Salama ................... | C02F 9/005 204/155 |

(Continued)

*Primary Examiner* — Ana Fortuna
(74) *Attorney, Agent, or Firm* — Eric Fincham

(57) ABSTRACT

The filtration membrane (102) includes an ozone producing circuit (120) having a plurality of electrically conductive lines (122, 124) disposed directly upon an active surface (102*a*) of the filtration membrane (102). The electrically conductive lines (122, 124) form spaced-apart and interleaved anodes (122) and cathodes (124). Ozone and other mixed oxidants coming from the ozone producing circuit (120) will prevent and/or remove biofilm formations on the active surface (102*a*) without the need of an outside source of gas. They can also remove at least some undesirable dissolved gases from the liquid being purified.

22 Claims, 2 Drawing Sheets

(51) Int. Cl.
*B01D 61/02* (2006.01)
*B01D 61/14* (2006.01)
*B01D 61/36* (2006.01)
*B01D 71/10* (2006.01)
*B01D 71/34* (2006.01)
*B01D 71/36* (2006.01)
*B01D 71/64* (2006.01)
*C02F 1/44* (2006.01)
*C02F 101/30* (2006.01)

(56) References Cited

U.S. PATENT DOCUMENTS

2006/0272954 A1\* 12/2006 Sumita .................... A61L 2/035
205/628
2011/0147318 A1\* 6/2011 Salama ............... C02F 1/46109
210/748.19
2014/0346110 A1\* 11/2014 Salama ................ B01D 61/025
210/636

\* cited by examiner

SEMIPERMEABLE FILTRATION MEMBRANE WITH INTEGRATED PRODUCING CIRCUIT

CROSS REFERENCE TO PRIOR APPLICATION

The present case claims the benefit of U.S. patent application No. 61/522,801 filed 12 Aug. 2011, which is hereby incorporated by reference in its entirety.

TECHNICAL FIELD

The technical field relates to semipermeable filtration membranes, such as those used in processes like membrane distillation, reverse osmosis, ultrafiltration, nanofiltration, etc.

BACKGROUND

Semipermeable filtration membranes are useful in many situations where a liquid must be purified. These membranes are constructed to be selective in their permeability. They allow certain molecules or ions to pass through them by diffusion but other molecules or ions are not allowed to pass.

One problem often encountered with filtration membranes is that after a given period of time, fouling and clogging may prevent the filtration membranes from operating efficiently. This is generally caused by relatively large organic molecules present in the liquid to be purified, for instance contaminated water. These molecules gradually form a biofilm, which biofilm can be generally defined as an undesirable accumulation of waterborne microorganisms and contaminants on the active surface of a filtration membrane. The active surface of a filtration membrane often creates a proper environment for the growth of these microorganisms. Over time, the biofilm can clog the pores of the filtration membrane. Frequent maintenance interventions are often needed as a result of this problem. This adds costs and complexity.

In some implementations, it can also be desirable to remove some of the dissolved gases from liquids going through filtration membranes. Examples of such dissolved gases are ammonia, hydrogen sulfide, volatile organic compounds (VOCs), volatile by-products of dissolved organic carbon (DOC) degradation and/or other low boiling point vapors contaminants. These gases can be present in liquids to be purified and may downgrade the quality of the purified liquids. Removing these dissolved gases, at least partially, is thus often desirable.

Clearly, there is still room for improvements in this area of technology.

SUMMARY

The proposed concept is to integrate an ozone producing circuit, with the active surface of a semipermeable filtration membrane. The ozone producing circuit will create ozone and other mixed oxidants directly at the active surface of the filtration membrane using the liquid to be purified as electrolyte. The ozone and the mixed oxidants will prevent and/or remove the biofilm formation by killing the microorganisms and chemically breaking down the relatively large organic molecules in the biofilm. No outside source of gas will be necessary. The ozone and the mixed oxidants can also oxidize some of the dissolved gases to transform them into non-harmful and non-clogging by-products.

In one aspect, there is provided a semipermeable filtration membrane for the purification of a liquid, the filtration membrane including an ozone producing circuit having a plurality of electrically conductive lines disposed directly upon an active surface of the filtration membrane, the active surface being made of a dielectric material, the electrically conductive lines forming interleaved anodes and cathodes that are spaced apart from one another.

In another aspect, there is provided a method of filtering a liquid, the method including: passing the liquid through a semipermeable filtration membrane; generating ozone and other mixed oxidants using electrical power provided to an ozone producing circuit disposed directly upon an active surface of the filtration membrane; and immediately using the generated ozone and the other mixed oxidants to kill microorganisms and to chemically break down organic molecules that may be present on the active surface.

In another aspect, there is provided a method of manufacturing a device for the purification of a liquid, the method including: providing a semipermeable filtration membrane having an active surface made of a dielectric material; and disposing an ozone producing circuit directly upon the active surface of the filtration membrane, the ozone producing circuit having a plurality of electrically conductive lines forming spaced-apart and interleaved anodes and cathodes.

Further details on these aspects as well as other aspects of the proposed concept will be apparent from the following detailed description and the appended figures.

DETAILED DESCRIPTION

Figure 1:
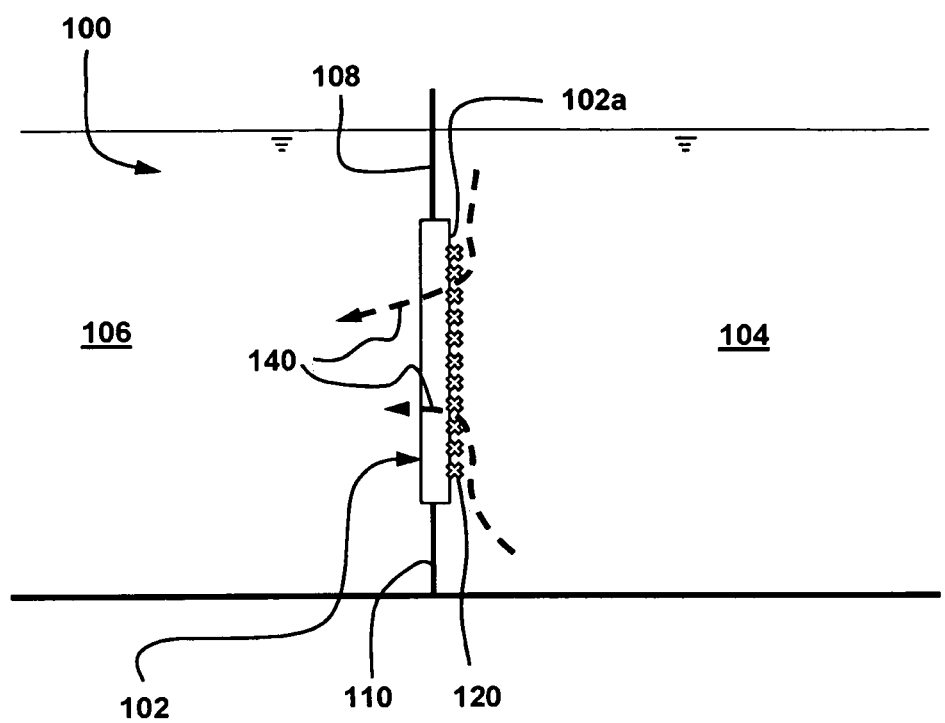
FIG. 1 is a semi-schematic side view of an example of a device provided with a semipermeable filtration membrane as proposed herein.

FIG. 1 is a semi-schematic side view of an example of a device 100 provided with a semipermeable filtration membrane 102 as proposed herein. The filtration membrane 102 is used for the purification of a liquid. The filtration membrane 102 can be used in various contexts, for instance in a membrane distillation process, a reverse osmosis process, an ultrafiltration process or a nanofiltration process. Other kinds of processes are possible as well.

The liquid to be purified can be for instance contaminated water, such as waste water or salt water to name just a few. The liquid can also simply be a liquid that needs a filtration for a purification thereof, for instance a liquid in food processing. The word "liquid" is thus used in a generic manner. The present description refers to "contaminated water" and "purified water" only as one example as a possible implementation. Also, in the present context, the word "contaminated" as well as other similar words and expressions are only indicative that "contaminants" are removed from the liquid once it passed through the filtration membrane 102. A "contaminated liquid" is not necessarily a toxic or harmful liquid.

In FIG. 1, the illustrated device 100 has a contaminated water side 104 on the right side with reference to the filtration membrane 102, and a purified water side 106 on the left side thereof. The filtration membrane 102 thus separates the two sides 104, 106 and prevents contaminants present in the contaminated water side 104 from going to the purified water side 106. Solid wall partitions 108, 110 located around the periphery of the filtration membrane 102 also prevent the two sides 104, 106 from mixing together in the illustrated example.

The filtration membrane 102 includes an ozone producing circuit 120 having a plurality of electrically conductive lines 122, 124 disposed directly upon an active surface 102a of the filtration membrane 102. The active surface 102a is located on the upstream side, thus on the contaminated water side 104 at the right in the illustrated example. At least the active surface 102a of the filtration membrane 102 is made of a dielectric material. The active surface 102a is used as a substrate for the ozone producing circuit 120. The electrically conductive lines 122, 124 of the illustrated example form interleaved anodes 122 and cathodes 124 that are spaced apart from one another.

Figure 2:
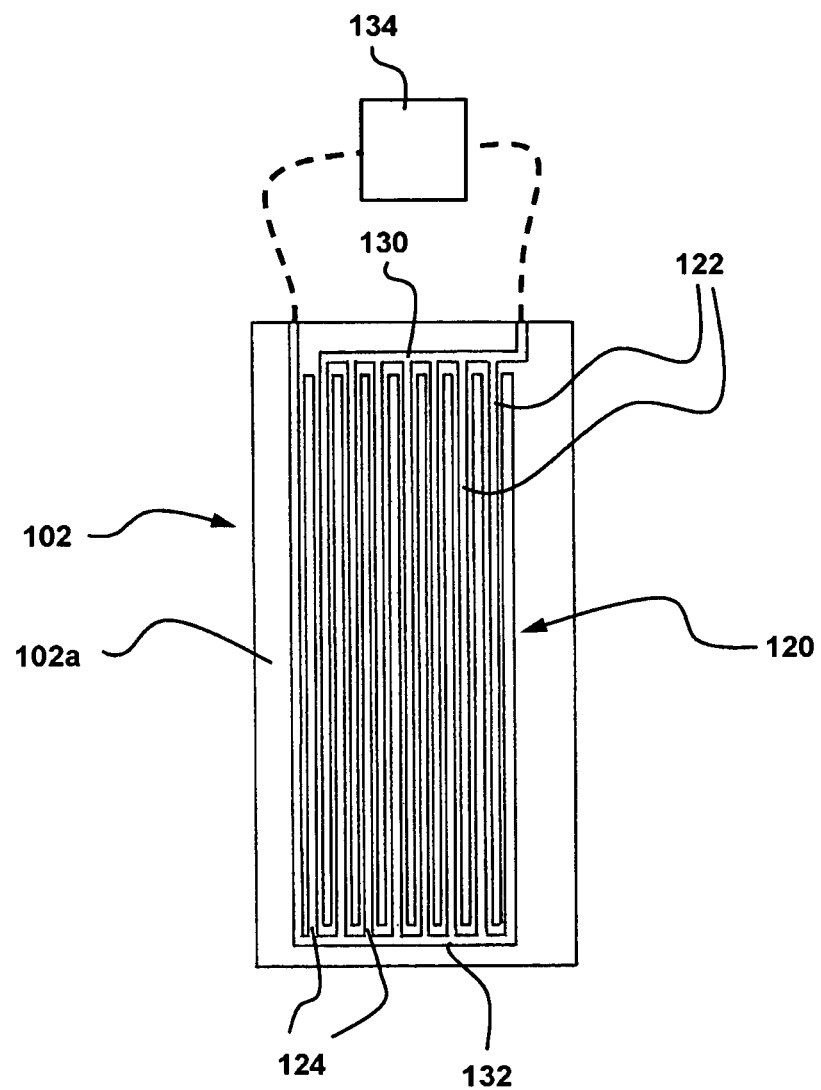
FIG. 2 is a semi-schematic front view of an example of a filtration membrane as proposed herein.

FIG. 2 is a semi-schematic front view of an example of a filtration membrane 102 as proposed herein. The illustrated ozone producing circuit 120 includes electrically conductive lines 122, 124 that are substantially rectilinear and parallel to one another.

Such arrangement is disclosed in U.S. Patent Application Publication No. 2011/147318 to A. Salama et al. published 23 Jun. 2011, the content of which is hereby incorporated by reference in its entirety. Variants are also possible as well.

As can be seen in FIG. 2, some of the electrically conductive lines are anodes 122 and some of the other lines are cathodes 124. The anodes 122 and the cathodes 124 are alternatively printed (i.e. interleaved). They may form regular or irregular patterns, the illustrated example showing a regular pattern. The anodes 122 and the cathodes 124 are also connected in parallel to each other using first and second trunk portions 130, 132. The trunk portions 130, 132 are part of the ozone producing circuit 120 and are electrically connected to corresponding terminals of an electrical power source 134, as schematically depicted in FIG. 2. In the illustrated example, the first and second trunk portions 130, 132 are substantially parallel to one another and are substantially perpendicularly disposed with reference to the corresponding electrically conductive lines 122, 124. Variants are possible as well.

The anodes 122 and the cathodes 124 are substantially regularly spaced from one another in the illustrated example. Variants are possible as well. The spacing between the anodes 122 and the cathodes 124 define liquid passages allowing the liquid from the contaminated water side 104 to flow through the filtration membrane 102, as depicted by arrows 140 in FIG. 1. Also, the ozone producing circuit 120 covers most of the area of the active surface 102a for a maximum efficiency in the illustrated example.

The filtration membrane 102 is illustrated in the enclosed figures as being substantially flat and rectangular. However, it should be noted that other shapes, configurations and arrangements are possible as well. For instance, the filtration membrane 102 could be irregular and/or curved, etc.

The ozone and the other mixed oxidants are created using the ozone producing circuit 120 when a voltage is applied between the adjacent anodes 122 and cathodes 124. The liquid from the contaminated water side 104 is used as an electrolyte and micro electrical discharges will be generated throughout the ozone producing circuit 120. The ozone and the mixed oxidants forming on the anodes 122 will prevent and/or remove the biofilm formation on the active surface 102a of the filtration membrane 102 by killing the microorganisms and chemically breaking down the relatively large organic molecules directly thereon. Also, some of the ozone and the mixed oxidants can be used to oxidize at least some of the dissolved gases present in the liquid passing through the filtration membrane 102. Examples of dissolved gases are low boiling point vapors contaminants, such as ammonia, hydrogen sulfide, volatile organic compounds (VOCs) or volatile by-products of dissolved organic carbon (DOC). Other low boiling point vapors contaminants can also be treated as well. The oxidation will transform these dissolved gases into non-harmful by-products.

In some cases, for example when the ozone producing circuit 120 is used with a hydrophobic membrane achieving a membrane distillation process, the ozone producing circuit 120 can be prefabricated and then glued or otherwise attached to the active surface 102a. Variants are possible as well.

Another possibility is to print the electrically conductive lines directly on the active surface 102a, using for instance a known printing process to form printed electrically conductive lines. Still, one can also form electrically conductive lines directly onto the active surface 102a itself. For instance, this can be done using an etching process that will form electrically conductive lines between etched portions of the active surface 102a, or using hot lasers to carbonize portions of the active surface 102a and make these portions electrically conductive. The filtration membrane 102 can be made of organic material such as Teflon™ (PTFE from DuPont), polyvinylidene difluoride (PVDF), polyimide or a cellulose base material, to name just a few. Variants are possible as well.

The ozone producing circuit 120 can be made of a conductive material including metals such as nickel, copper, gold, silver, aluminum, mixed metal oxides (MMO), ruthenium, rhodium, palladium, iridium, titanium, platinum, zirconium, hafnium, vanadium, niobium, tantalum and combinations thereof, or a film of diamond, such as a film of chemical vapor deposited diamond. It can also be made of other non-metallic materials such as conductive inks, or of composite materials, for instance materials including polyaniline, epoxy-filled silver, gold, copper, nickel or carbon, and combinations thereof. Other materials are also possible.

In use, the ozone producing circuit 120 can be operated continuously and/or at given intervals, depending on the context, while the liquid is being filtered. The electrical power supplied to the ozone producing circuit 120 can also be continuous and/or pulsed.

As can be appreciated, the device 100 can greatly reduce the need of conducting maintenance operations or their frequency. The useful life of the filtration membrane 102 can then be extended and its performance enhanced compared to previous filtration membranes. The ozone producing circuit 120 can also be useful in reducing or even eliminating some undesirable dissolved gases, thereby improving the quality of the purified liquids.

The present detailed description and the appended figures are meant to be exemplary only, and a skilled person will recognize that many changes can be made while still remaining within the proposed concept.

We claim:

1. A semipermeable filtration membrane (102) suitable for the purification of a liquid capable of producing ozone, the filtration membrane (102) including an ozone producing circuit (120) having a plurality of electrically conductive lines (122, 124) disposed directly upon an active surface (102a) of the filtration membrane (102), the active surface (102a) being made of a dielectric material, the electrically conductive lines (122, 124) forming interleaved anodes (122) and cathodes (124) that are spaced apart from one another.

2. The filtration membrane (102) as defined in claim 1, wherein at least some of the electrically conductive lines (122, 124) of the ozone producing circuit (120) are substantially rectilinear and parallel to one another.

3. The filtration membrane (102) as defined in claim 2, wherein the substantially rectilinear and parallel lines are substantially regularly spaced, the spacing between each adjacent anode (122) and cathode (124) defining an area permitting liquid passage through the filtration membrane (102).

4. The filtration membrane (102) as defined in claim 2 or 3, wherein the ozone producing circuit (120) includes a first trunk portion (130) to which are attached at least some of the anodes (122), and includes a second trunk portion (132) to which are attached the cathodes (124) that are adjacent to the anodes (122) attached to the first trunk portion (130).

5. The filtration membrane (102) as defined in claim 4, wherein the first and second trunk portions (130, 132) are substantially parallel to one another and are substantially perpendicularly disposed with reference to the corresponding electrically conductive lines (122, 124).

6. The filtration membrane (102) as defined in claim 5, wherein the ozone producing circuit (120) covers most of the area of the active surface (102a).

7. The filtration membrane (102) as defined in claim 6, wherein the electrically conductive lines (122, 124) of the ozone producing circuit (120) are attached to the active surface (102a).

8. The filtration membrane (102) as defined in claim 7, wherein the electrically conductive lines (122, 124) are glued onto the active surface (102a).

9. The filtration membrane (102) as defined in claim 7, wherein the electrically conductive lines (122, 124) are printed electrically conductive lines.

10. The filtration membrane (102) as defined in claim 7, wherein the electrically conductive lines (122, 124) are formed directly onto the active surface (102a).

11. The filtration membrane (102) as defined in claim 10, wherein the electrically conductive lines (122, 124) are located between etched portions of the active surface (102a).

12. The filtration membrane (102) as defined in claim 10, wherein the electrically conductive lines (122, 124) are laser carbonized portions of the active surface (102a).

13. The filtration membrane (102) as defined in any one of claims 10 to 12, wherein the filtration membrane (102) is made of an organic material, selected from Teflon™ (PTFE from DuPont), polyvinylidene difluoride (PVDF), polyimide and/or cellulose base material.

14. A method of filtering a liquid containing water, the method including:
   passing the liquid through a semipermeable filtration membrane (102);
   generating ozone and other mixed oxidants using electrical power provided to an ozone producing circuit (120) disposed directly upon an active surface of a dielectric material (102a) of the filtration membrane (102);
   whereby the generated ozone and the other mixed oxidants kill microorganisms and chemically break down organic molecules that may be present on the active surface (102a).

15. The method as defined in claim 14, wherein the filtration membrane (102) is used in a membrane distillation process, a reverse osmosis process, an ultrafiltration process or a nanofiltration process.

16. The method as defined in any one of claims 14 to 15, wherein the liquid includes contaminated water selected from the group consisting of waste water and salt water.

17. A method of manufacturing a device (100) suitable for the purification of a liquid capable of producing ozone, the method including:
   providing a semipermeable filtration membrane (102) having an active surface (102a) made of a dielectric material; and
   disposing an ozone producing circuit (120) directly upon the active surface (102a) of the filtration membrane (102), the ozone producing circuit (120) having a plurality of electrically conductive lines (122, 124) forming spaced-apart and interleaved anodes (122) and cathodes (124).

18. The method as defined in claim 17, wherein the act of disposing the ozone producing circuit (120) directly upon the active surface (102a) includes prefabricating the ozone producing circuit (120) and gluing the prefabricated ozone producing circuit (120) onto the active surface (102a).

19. The method as defined in claim 17, wherein the act of disposing the ozone producing circuit (120) directly upon the active surface (102a) includes printing the ozone producing circuit (120) onto the active surface (102a).

20. The method as defined in claim 17, wherein the act of disposing the ozone producing circuit (120) directly upon the active surface (102a) includes etching the ozone producing circuit (120) onto the active surface (102a).

21. The method as defined in claim 17, wherein the act of disposing the ozone producing circuit (120) directly upon the active surface (102a) includes laser carbonizing portions of the active surface (102a) to dispose the ozone producing circuit (120).

22. The method as defined in any one of claims 17 to 21, wherein the method further includes:
   providing an electrical power source (134); and
   electrically connecting the electrical power source (134) to the ozone producing circuit (120).

* * * * *